United States Patent
Markgraf et al.

(10) Patent No.: US 9,540,553 B2
(45) Date of Patent: *Jan. 10, 2017

(54) WEATHER RESISTANT POLYOXYMETHYLENE COMPOSITIONS

(71) Applicant: Ticona GmbH, Sulzbach, Taunus (DE)

(72) Inventors: Kirsten Markgraf, Weinheim (DE); Bruce M. Mulholland, Hebron, KY (US); Dan Murena, Nethen (BE); Joachim Floeck, Brechen (DE)

(73) Assignee: Ticona GmbH, Sulzbach (Taunus) (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/372,498

(22) PCT Filed: Mar. 15, 2013

(86) PCT No.: PCT/EP2013/055469
§ 371 (c)(1),
(2) Date: Jul. 16, 2014

(87) PCT Pub. No.: WO2013/156227
PCT Pub. Date: Oct. 24, 2013

(65) Prior Publication Data
US 2015/0299544 A1    Oct. 22, 2015

(30) Foreign Application Priority Data
Apr. 17, 2012    (EP) .................... 12164395

(51) Int. Cl.
C09K 3/18    (2006.01)
C08L 59/02    (2006.01)
C08K 5/3435    (2006.01)
C08K 7/14    (2006.01)
C08G 18/56    (2006.01)
C08G 18/76    (2006.01)
C08K 5/29    (2006.01)
C08K 9/08    (2006.01)

(52) U.S. Cl.
CPC ............... C09K 3/18 (2013.01); C08G 18/56 (2013.01); C08G 18/7671 (2013.01); C08K 5/3435 (2013.01); C08K 7/14 (2013.01); C08L 59/02 (2013.01); C08K 5/29 (2013.01); C08K 9/08 (2013.01)

(58) Field of Classification Search
CPC ........... C09K 3/18; C08K 5/3435; C08K 7/14; C08L 59/02; C08G 18/56
See application file for complete search history.

(56) References Cited

U.S. PATENT DOCUMENTS

| | | |
|---|---|---|
| 3,455,867 A | 7/1969 | Berardinelli et al. |
| 3,574,786 A | 4/1971 | Ishida et al. |
| 3,901,846 A | 8/1975 | Freed |
| 3,985,661 A | 10/1976 | Ikeda et al. |
| 4,070,415 A | 1/1978 | Sextro et al. |
| 4,446,263 A * | 5/1984 | Bryant ........................ 524/100 |
| 4,469,842 A | 9/1984 | Kritchevsky |
| 4,480,071 A | 10/1984 | Natarajan et al. |
| 4,493,751 A | 1/1985 | Cherdron et al. |
| 4,652,594 A | 3/1987 | Auerbach et al. |
| 4,670,508 A | 6/1987 | Ohdaira et al. |
| 4,780,508 A | 10/1988 | Cunningham et al. |
| 4,828,755 A | 5/1989 | Kusumgar et al. |
| 4,929,712 A | 5/1990 | Sugiyama et al. |
| 5,096,951 A * | 3/1992 | Auerbach ............. C08K 5/098 524/100 |
| 5,156,913 A | 10/1992 | Collins et al. |
| 5,326,846 A | 7/1994 | Nagai et al. |
| 5,344,875 A | 9/1994 | Niino |
| 5,393,813 A | 2/1995 | Schauhoff et al. |
| 5,446,086 A | 8/1995 | Sugiyama et al. |
| 5,478,895 A | 12/1995 | Sugiyama et al. |
| 5,530,061 A | 6/1996 | Sanada et al. |
| 5,866,256 A | 2/1999 | Izumitani et al. |
| 5,942,568 A | 8/1999 | Niino et al. |
| 6,077,908 A | 6/2000 | Yahiro |
| 6,211,268 B1 | 4/2001 | Matsumura et al. |
| 6,238,733 B1 | 5/2001 | Therolf |
| 6,271,302 B1 | 8/2001 | Matsushima |
| 6,936,651 B2 | 8/2005 | Flexman et al. |
| 7,169,887 B2 | 1/2007 | Papke |
| 7,943,726 B2 | 5/2011 | Haubs et al. |
| 8,178,479 B2 | 5/2012 | Cernohous |
| 8,318,866 B2 | 11/2012 | Kurz |

(Continued)

FOREIGN PATENT DOCUMENTS

| | | |
|---|---|---|
| CN | 101130621 | 2/2008 |
| CN | 101343396 | 1/2009 |

(Continued)

OTHER PUBLICATIONS

Additives for Specialty Polymers. pp. 1-10. BASF. 2010.*
Kawaguchi et al., "Tensile Behavior of Glass-Fiber Filled Polyacetal: Influence of the Functional Groups of Polymer Matrices", Journal of Applied Polymer Science, Wiley, US, vol. 107, No. 1., Jan. 5, 2008, pp. 667-673.
Zhou JianSong et al, "Advance on tribological performance of ultra high molecular weight polyethylene" Journals of Materials and Engineering, vol. 23, No. 1, pp. 142-145.
Deng Wenjuan et al, "Study on tribological properties of PON/HDPE blend", Engineering Plastics Application, vol. 38, No. 6, pp. 54-56, Apr. 19, 2010.
Search Report & Written Opinion for Application No. PCT/EP2013/055469 dated May 8, 2013.

(Continued)

*Primary Examiner* — John Uselding
(74) *Attorney, Agent, or Firm* — Dority & Manning, P.A.

(57) ABSTRACT

The present invention relates to a composition comprising a) at least one polyoxymethylene (A) having terminal OH-groups of more than 15 mmol/kg, b) at least one coupling agent (B), c) one or more hindered amine light stabilizer (C) having a molecular weight ranging from 500 to 1000 g/mol, and d) optionally at least one reinforcing fiber (D).

16 Claims, No Drawings

(56) References Cited

U.S. PATENT DOCUMENTS

| | | | |
|---|---|---|---|
| 8,829,085 | B2 | 9/2014 | Markgraf et al. |
| 2005/0043492 | A1 | 2/2005 | Chin et al. |
| 2005/0107513 | A1* | 5/2005 | Papke ................ 524/494 |
| 2005/0222303 | A1 | 10/2005 | Cernohous |
| 2006/0058457 | A1 | 3/2006 | Kawaguchi |
| 2006/0111473 | A1 | 5/2006 | Yuan et al. |
| 2007/0066746 | A1 | 3/2007 | Gunnewig et al. |
| 2010/0022691 | A1 | 1/2010 | Katsuchi et al. |
| 2010/0056676 | A1 | 3/2010 | Hase |
| 2011/0184098 | A1 | 7/2011 | Sunaga et al. |
| 2013/0102718 | A1 | 4/2013 | Markgraf et al. |
| 2013/0331488 | A1 | 12/2013 | Markgraf |
| 2014/0179865 | A1 | 6/2014 | Markgraf et al. |

FOREIGN PATENT DOCUMENTS

| | | |
|---|---|---|
| CN | 101759955 | 6/2010 |
| CN | 102532798 | 7/2012 |
| CN | 103131124 | 6/2013 |
| DE | 2162345 | 7/1972 |
| EP | 1630198 A1 | 1/2006 |
| GB | 1331829 | 9/1973 |
| JP | 55-145529 | 11/1980 |
| JP | 56-105905 | 8/1981 |
| JP | 3284675 | 12/1991 |
| JP | 6179671 | 6/1994 |
| JP | 7010871 | 1/1995 |
| JP | 7033766 | 2/1995 |
| JP | 07242724 | 9/1995 |
| JP | 11 181232 | 7/1999 |
| JP | 11181231 | 7/1999 |
| JP | 2000154181 | 6/2000 |
| JP | 2000-336241 | 12/2000 |
| JP | 4741120 | 6/2002 |
| JP | 2009-286874 | 12/2009 |
| JP | 2010037445 | 2/2010 |
| JP | 2011246566 | 12/2011 |
| WO | WO 9946331 | 9/1999 |
| WO | WO 2006/105918 A1 | 12/2006 |
| WO | WO 2010/035351 A1 | 1/2010 |
| WO | WO 2010/073529 | 7/2010 |
| WO | WO 2013/156227 | 10/2013 |

OTHER PUBLICATIONS

Mehrabzadeh et al. Impact Modification of Polyacetal by Thermoplastic Elastomer Polyurethane. Journal of Applied Polymer Science, vol. 84, 2573-2582 (2002).
GUR ultra-high molecular weight polyethylene. Ticona. Mar. 2001.
JPH0822122 English abstract only, Jan. 23, 1996.

\* cited by examiner

WEATHER RESISTANT POLYOXYMETHYLENE COMPOSITIONS

RELATED APPLICATIONS

This present application claims priority to PCT International Patent Application No, PCT/EP2013/055469 having a filing date of Mar. 15, 2013, and which claims filing benefit to European Patent Application No. 12164395.1 filed on Apr. 17, 2012, which are all hereby incorporated by reference in their entirety.

The present invention relates to a molding composition, a process for the manufacturing of said molding composition, molded parts obtainable therefrom as well as the use of the molding composition for the manufacturing of molded parts used in the automotive industry, or for housings, wiper systems, sun roof systems and wiper arms.

The superior mechanical properties of polyoxymethylene (POM) molding compositions are the reason for their use in numerous applications. To improve their properties, the polyoxymethylene homo- and -copolymers are provided with additives to adapt the properties to the application, for example by using reinforcing fibers.

The effect of these additives on the properties of the molding composition is affected by the coupling of the additive to the plastics matrix. Attempts to couple glass fibers to a polyoxymethylene matrix are known in the prior art.

DE 2162345 discloses a thermoplastic composition comprising a polyoxymethylene, an isocyanate coupling agent and reinforcing glass fibers wherein the glass fibers are sized with aminoalkylsilane compounds. The diisocyanate coupling agent is used to improve the compatibility of the polyoxymethylene matrix with the reinforcing fibers.

Isocyanate coupling agents are highly reactive with nucleophilic groups such as OH or $NH_2$ groups. Therefore, the use of further additives to reinforce polyoxymethylene compositions which comprise coupling agents on basis of isocyanates are limited.

US 2005/0107513 tries to avoid these problems and uses a catalyst which catalyses the chemical reaction between the polyacetal matrix polymer and the surface of the additive, i.e. the glass fiber. Thus, the use of a coupling agent is avoided. However, coupling agents such as isocyanates are very effective and contribute to the mechanical properties of the fiber reinforced polyoxymethylene compositions. On the other hand, sensitive additives which can react with the coupling agents were believed to be avoided. Consequently, additives which reduce the formaldehyde emission have not been used in the prior art for fiber reinforced polyoxymethylene molding compositions due to the presence of highly reactive isocyanate coupling agents.

Likewise the use of UV stabilizer together with the highly reactive isocyanate coupling agents has been avoided since it was believed that the reaction of the coupling agents deactivates the stabilizer. However, especially for exterior applications such as window wiper systems an UV stabilization as well as excellent mechanical properties are desired. Further, a drawback of fiber reinforced molding compositions is the insufficient flow property which is required for many molding techniques such as injection molding, especially in complex parts. An insufficient flow property may give rise to problems with the surface quality of the molded articles, i.e. the surface appears rough and after treatment steps may become necessary.

Additionally, polyoxymethylene based molding compositions with improved flow properties are not only needed for good surface quality, especially for thin-walled molded products but also for achieving a higher content of reinforcing materials. Melt temperature for fast flowing products could be decreased resulting in shorter cooling cycles and reduced cycle time in the injection molding process.

The object of the present invention is the provision of a polyoxymethylene composition which demonstrates improved mechanical properties while having excellent UV stability and weatherability performance.

A further object of the invention is the provision of fiber reinforced polyoxymethylene compositions which show an excellent tensile strength while having good flow properties.

It has surprisingly been found that especially fiber reinforced compositions which comprise at least one polyoxymethylene with a high amount of hydroxy groups, at least one coupling agent, at least one specific UV stabilizer and optionally at least one reinforcing fiber lead to a molding composition which has excellent mechanical properties and excellent UV stability and weatherability performance and additionally good flow properties which are required for many applications especially in the automotive industry and in exterior applications.

An embodiment of the present invention is a composition comprising
 a) at least one polyoxymethylene (A) having terminal OH-groups of more than 15 mmol/kg,
 b) at least one coupling agent (B),
 c) at least one hindered amine light stabilizer (C) having a molecular weight ranging from 500 to 1000 g/mol,
 d) optionally at least one reinforcing fiber (D).

Component (A)

The composition according to the present invention comprises at least one polyoxymethylene (A) having terminal OH-groups of more than 15 mmol/kg (hereinafter also referred to as "component (A)"). Component (A) of the molding composition according to the invention is a polyoxymethylene homo- or -copolymer. Preferably, the polyoxymethylene (A) has a high content of terminal hydroxyl groups and more preferably contains no low molecular weight constituents or only a small proportion thereof. Polyoxymethylene (A) preferably has terminal hydroxyl groups, for example hydroxyethylene groups ($—OCH_2CH_2—OH$) and hemi-acetal groups ($—OCH_2—OH$). According to a preferred embodiment, at least 25%, preferably at least 50%, more preferably at least 75% of the terminal groups of the polyoxymethylene (A) are hydroxyl groups, especially hydroxyethylene groups.

The content of hydroxyl groups end groups is especially preferred at least 80%, based on all terminal groups. Within the meaning of the present invention, the term "all terminal groups" is to be understood as meaning all terminal and—if present—all side terminal groups.

In addition to the terminal hydroxyl groups, the POM may also have other terminal groups usual for these polymers. Examples of these are alkoxy groups, formate groups, acetate groups or aldehyde groups. According to a preferred embodiment of the present invention the polyoxymethylene (A) is a homo- or copolymer which comprises at least 50 mol-%, preferably at least 70 mol-%, more preferably at least 90 mol-% and most preferably at least 95 mol-% of $—CH_2O—$repeat units.

It has been found that molding compositions which demonstrate an extremely high impact resistance can be obtained with a polyoxymethylene (A) which has low molecular weight constituents having molecular weights below 10,000 Dalton of less than 15% by weight, preferably less than 10% by weight, more preferably less than 7% by weight and most preferably less than 5% by weight, based on the total mass of the polyoxymethylene.

The "POM polymers" which can be used as polyoxymethylene (A) generally have a melt volume rate MVR of less than 50 cm³/10 min, preferably ranging from 1 to 50 cm³/10 min, further preferably ranging from 1 to 20 cm³/10 min, more preferably ranging from 2 to 15 cm³/10 min and especially ranging from 4 to 13 cm³/10 min, determined according to ISO 1133 at 190° C. and 2.16 kg.

However, especially good flow properties can be achieved with a polyoxymethylene (A) having a higher melt volume rate MVR. According to an alternative embodiment of the present invention the polyoxymethylene (A) has a MVR of more than 7 cm³/10 min or more than 15 cm³/10 min, preferably ranging from 20 to 100 cm³/10 min or ranging from 20 to 50 cm³/10 min, especially ranging from 25 to 45 cm³/10 min, determined according to ISO 1133 at 190° C. and 2.16 kg.

Furthermore, it has been observed that impregnation of the long fibers as well as short fibers is improved with polyoxymethylenes having a higher melt volume rate MVR as defined above.

Preferably, polyoxymethylene (A) has a content of terminal hydroxyl groups of at least 16 mmol/kg, preferably at least 18 mmol/kg, more preferably ranging from 15 to 50 mmol/kg and most preferably ranging from 18 to 40 mmol/kg, especially ranging from 20 to 30 mmol/kg.

However, depending on the application of the molding composition and the nature and structure of the reinforcing fibers in the molding composition a higher content of terminal hydroxyl groups can be desired. Further, it has surprisingly found that the flow properties as well as the weatherability performance can be improved by using a polyoxymethylene (A) having a higher content of terminal hydroxyl groups. According to an alternative embodiment of the present invention the polyoxymethylene (A) has a content of terminal hydroxyl groups of at least 40 mmol/kg, preferably at least 50 mmol/kg, more preferably ranging from 54 to 95 mmol/kg and most preferably ranging from 70 to 90 mmol/kg or 54 to 80 mmol/kg, especially ranging from 75 to 85 mmol/kg. It has been found that especially the mechanical performance of long fiber reinforced compositions can be improved by use of a polyoxymethylene with a higher content of terminal hydroxyl groups. Furthermore, impregnation of the long fibers as well as the impregnation of the short fibers is improved.

The content of terminal hydroxyl groups can be determined as described in K. Kawaguchi, E. Masuda, Y. Tajima, Journal of Applied Polymer Science, Vol. 107, 667-673 (2008).

The preparation of the polyoxymethylene (A) can be carried out by polymerization of polyoxymethylene-forming monomers, such as trioxane or a mixture of trioxane and dioxolane, in the presence of ethylene glycol as a molecular weight regulator. The polymerization can be effected as precipitation polymerization or in particular in the melt. Initiators which may be used are the compounds known per se, such as trifluoromethane sulfonic acid, these preferably being added as solution in ethylene glycol to the monomer. The procedure and termination of the polymerization and working-up of the product obtained can be carried out according to processes known per se. By a suitable choice of the polymerization parameters, such as duration of polymerization or amount of molecular weight regulator, the molecular weight and hence the MVR value of the resulting polymer can be adjusted. The criteria for choice in this respect are known to the person skilled in the art. The above-described procedure for the polymerization leads as a rule to polymers having comparatively small proportions of low molecular weight constituents. If a further reduction in the content of low molecular weight constituents were to be desired or required, this can be effected by separating off the low molecular weight fractions of the polymer after the deactivation and the degradation of the unstable fractions after treatment with a basic protic solvent.

This may be a fractional precipitation from a solution of the stabilized polymer, polymer fractions of different molecular weight distribution being obtained.

Preference is also given to polyoxymethylene (A) which also is obtainable by polymerizing polyoxymethylene forming monomers in the presence of heteropoly acids.

In one embodiment, a polyoxymethylene polymer with hydroxyl terminal groups can be produced using a cationic polymerization process followed by solution hydrolysis to remove any unstable end groups. During cationic polymerization, a glycol, such as ethylene glycol can be used as a chain terminating agent. The cationic polymerization results in a bimodal molecular weight distribution containing low molecular weight constituents. In one embodiment, the low molecular weight constituents can be significantly reduced by conducting the polymerization using a heteropoly acid such as phosphotungstic acid as the catalyst. When using a heteropoly acid as the catalyst, for instance, the amount of low molecular weight constituents can be less than 2% by weight.

The heteropoly acid is a generic term for polyacids formed by the condensation of different kinds of oxo acids through dehydration and contains a mono- or poly-nuclear complex ion wherein a hetero element is present in the center and the oxo acid residues are condensed through oxygen atoms. Such a heteropoly acid is represented by the formula:

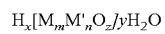

$$H_x[M_mM'_nO_z]yH_2O$$

wherein

M represents an element selected from the group consisting of P, Si, Ge, Sn, As, Sb, U, Mn, Re, Cu, Ni, Ti, Co, Fe, Cr, Th and Ce, M' represents an element selected from the group consisting of W, Mo, V and Nb, m is 1 to 10, n is 6 to 40, z is 10 to 100, x is an integer of 1 or above, and y is 0 to 50.

The central element (M) in the formula described above may be composed of one or more kinds of elements selected from P and Si and the coordinate element (M') is composed of at least one element selected from W, Mo and V, particularly W or Mo.

Specific examples of heteropoly acids are selected from the group consisting of phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts thereof.

Excellent results have been achieved with heteropoly acids selected from 12-molybdophosphoric acid ($H_3PMo_{12}O_{40}$) and 12-tungstophosphoric acid ($H_3PW_{12}O_{40}$) and mixtures thereof.

The heteropoly acid may be dissolved in an alkyl ester of a polybasic carboxylic acid. It has been found that alkyl esters of polybasic carboxylic acid are effective to dissolve the heteropoly acids or salts thereof at room temperature (25° C.).

The alkyl ester of the polybasic carboxylic acid can easily be separated from the production stream since no azeotropic mixtures are formed. Additionally, the alkyl ester of the polybasic carboxylic acid used to dissolve the heteropoly acid or an acid salt thereof fulfils the safety aspects and environmental aspects and, moreover, is inert under the conditions for the manufacturing of oxymethylene polymers.

Preferably the alkyl ester of a polybasic carboxylic acid is an alkyl ester of an aliphatic dicarboxylic acid of the formula:

$$(ROOC)-(CH_2)_n-(COOR')$$

wherein n is an integer from 2 to 12, preferably 3 to 6 and

R and R' represent independently from each other an alkyl group having 1 to 4 carbon atoms, preferably selected from the group consisting of methyl, ethyl, n-propyl, iso-propyl, n-butyl, iso-butyl and tert.-butyl.

In one embodiment, the polybasic carboxylic acid comprises the dimethyl or diethyl ester of the above-mentioned formula, such as a dimethyl adipate (DMA). The alkyl ester of the polybasic carboxylic acid may also be represented by the following formula:

$$(ROOC)_2-CH-(CH_2)_m-CH-(COOR')_2$$

wherein m is an integer from 0 to 10, preferably from 2 to 4 and

R and R' are independently from each other alkyl groups having 1 to 4 carbon atoms, preferably selected from the group consisting of methyl, ethyl, n-propyl, iso-propyl, n-butyl, iso-butyl and tert.-butyl.

Particularly preferred components which can be used to dissolve the heteropoly acid according to the above formula are butantetracarboxylic acid tetratethyl ester or butantetracarboxylic acid tetramethyl ester.

Specific examples of the alkyl ester of a polybasic carboxylic acid are selected from the group consisting of dimethyl glutaric acid, dimethyl adipic acid, dimethyl pimelic acid, dimethyl suberic acid, diethyl glutaric acid, diethyl adipic acid, diethyl pimelic acid, diethyl suberic acid, diemethyl phthalic acid, dimethyl isophthalic acid, dimethyl terephthalic acid, diethyl phthalic acid, diethyl isophthalic acid, diethyl terephthalic acid, butantetracarboxylic acid tetramethylester and butantetracarboxylic acid tetraethylester as well as mixtures thereof. Other examples include dimethylisophthalate, diethylisophthalate, dimethylterephthalate or diethylterephthalate.

Preferably, the heteropoly acid is dissolved in the alkyl ester of the polybasic carboxylic acid in an amount lower than 5 weight percent, preferably in an amount ranging from 0.01 to 5 weight percent, wherein the weight is based on the entire solution.

As mentioned before, the term polyoxymethylenes comprises both, homopolymers of formaldehyde or its cyclic oligomers, such as trioxane or 1,3,5,7-tetraoxacyclooctane, and corresponding copolymers. For example the following components can be used in the polymerization process: ethyleneoxide, 1,2-propyleneoxide, 1,2-butyleneoxide, 1,3-butyleneoxide, 1,3-dioxane, 1,3-dioxolane, 1,3-dioxepane and 1,3,6-trioxocane as cyclic ethers as well as linear oligo- or polyformales, like polydioxolane or polydioxepane.

Further, functionalized polyoxymethylenes which are prepared by copolymerization of trioxane and the formal of trimethylolpropane (ester), of trioxane and the alpha, alpha and the alpha, beta-isomers of glyceryl formal (ester) or of trioxane and the formal of 1,2,6-hexantriol (ester) can be used as polyoxymethylene (A).

Such POM homo- or copolymers are known per se to the person skilled in the art and are described in the literature.

The composition of the present invention preferably comprises polyoxymethylene (A) in an amount of up to 95 weight-% (wt.-%), preferably ranging from 40 to 90 weight-%, more preferably ranging from 55 to 85 weight-%, wherein the weight is based on the total weight of the molding composition.

Component (B)

As a further component, the composition of the present invention comprises at least one coupling agent (B).

The coupling agent provides a linkage between the polyoxymethylene (A) and the reinforcing fiber (D), if present and/or the sizing material which is coated on the reinforcing fiber (D), if present. In principle any coupling agent which is capable to react with nucleophilic groups such as —OH or —NH$_2$ can be used.

The coupling agent improves the compatibility of the reinforcing fibers (D), if present in the polymer matrix.

Further, it has been found that the coupling agent improves the mechanical properties and also contributes to the improved flow properties as well as the improved weatherability performance when used together with the light stabilizer (C).

A suitable coupling agent (B) is a polyisocyanate, preferably organic diisocyanate, more preferably a polyisocyanate selected from the group consisting of aliphatic diisocyanates, cycloaliphatic diisocyanates, aromatic diisocyanates and mixtures thereof.

Preferred are polyfunctional coupling agents, such as trifunctional or bifunctional agents.

Preferably, the polyisocyanate is a diisocyanate or a triisocyanate which is more preferably selected from 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3, 5-trimethyl-5-isocyanatomethylcyclohexane; isocyanato-ethylcyclohexane isocyanate; bis(isocyanatomethyl)-cyclohexane diisocyanate; 4,4'-bis(isocyanato-methyl)

dicyclohexane; 2,4'-bis(isocyanatomethyl)dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclo-hexyl isocyanate, 1-isocyanato-3,3,5-trimethyl-5-isocyanatomethylcyclohexane, cyclo-hexyl isocyanate, dicyclohexylmethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, or mixtures thereof.

Especially preferred are aromatic polyisocyanates, such as 4,4'-diphenylmethane diisocyanate (MDI).

The composition of the present invention comprises the coupling agent (B) preferably in an amount ranging from 0.1 to 5 weight-%, more preferably ranging from 0.2 to 3 weight-% and most preferably ranging from 0.3 to 1.5 weight-%, wherein the weight is based on the total weight of the composition.

Component (C)

A further component of the composition of the present invention is a hindered amine light stabilizer (C) having a molecular weight ranging from 500 to 1000 g/mol (herein also referred to as "component (C)" or "light stabilizer (C)".

It has been found that the use of the specific light stabilizer (C) having a hindered amine moiety and a molecular weight ranging from 500 to 1000 g/mol leads to excellent results in terms of weatherability for the composition of the invention and the molding compositions obtained therefrom.

Hindered amine light stabilizer (abbreviated as HALS) are derivatives of 2,2,6,6-tetramethyl piperidine. It has been found that the light stabilizer (C) is an extremely efficient stabilizer against light-induced degradation of the composition of the present invention, if the molecular weight is ranging from 500 to 1000 g/mol, preferably ranging from 550 to 950 g/mol or 550 to 900 g/mol and especially ranging from 600 to 850 g/mol or ranging from 650 to 800 g/mol, in particular ranging from 650 to 750 g/mol.

According to a preferred embodiment the light stabilizer (C) has additionally an antioxidant moiety. It has been surprisingly found that an additional antioxidant moiety comprising —OH or —NH$_2$ groups improves the weatherability performance and is well implemented in the polymer matrix which may be due to the coupling agent.

Suitable antioxidant moieties are substituted or unsubstituted phenol moieties. Preferably, the antioxidant moieties are sterically hindered phenolic moieties where at least one substituent, is in the ortho position to the phenolic OH-group, preferably the phenolic moiety comprises one or two branched alkyl groups in the ortho position to the phenolic OH group, e.g. a di-tert-butyl phenol moiety.

According to a further preferred embodiment the light stabilizer (C) molecule comprises two or more sterically hindered amine groups. This even improves the effect of the light stabilizer in the composition of the present invention. Preferred light stabilizer (C) to be used in the composition or molding composition of the present invention comprise a 2,2,6,6-tetramethyl piperidine moiety as reflected in the following formula (I):

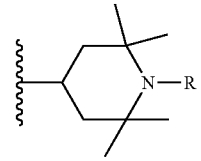

Formula (I)

with R being H, branched or unbranched alkyl, substituted or unsubstituted alkyl, alkyl groups which may be interrupted by one or more hetero atoms such as O or N.

Preferably R in Formula I is H or a $C_1$ to $C_{20}$-alkyl, more preferably a $C_1$ to $C_{10}$-alkyl, especially methyl, ethyl, propyl, butyl, pentyl and hexyl. In an exemplary embodiment the substituent R is methyl.

It has been found that particularly good results in terms of weatherability performance can be achieved with a light stabilizer (C) which comprises at least one tertiary amine moiety such as the hindered amine moiety according to the above mentioned formula I wherein R is not a hydrogen radical but an alkyl moiety. According to a further aspect of the present invention the light stabilizer does not comprise a nitrogen atom which is attached to a hydrogen atom.

According to a further aspect of the invention the hindered amine moiety such as the moiety reflected in formula I is connected via a linker with an antioxidant moiety. A suitable linker may comprise ester or amido groups.

According to a further aspect of the present invention the light stabilizer (C) may have a melting point above 100° C., preferably ranging from 110 to 200° C., more preferably ranging from 120 to 180° C., especially ranging from 130 to 160° C.

Light stabilizer(s) (C) as described above are commercially available. An especially preferred light stabilizer (C) is Bis(1,2,2,6,6-penta methyl-4-piperidinyl) [[3,5-bis(1,1-dimethylethyl)-4-hydroxyphenyl]methyl]butylmalonate which is commercially available as Tinuvin® 144 from BASF.

Typically the light stabilizer (C) is present in an amount ranging from 0.01 to 3 wt.-%, preferably 0.05 to 2 wt.-% and especially 0.1 to 1 wt.-%, based on the total weight of the composition.

The light stabilizer (C) may be added to the other components of the composition prior to the reactive processing step or after. However, it has been found that the addition of the light stabilizer to the composition prior to the reactive processing step (melt mixing step) is advantageous since the light stabilizer (C) is better fixed in the polymer matrix.

According to a further aspect of the invention the composition may comprise additionally an ultraviolet light absorber (F) which is different from the light stabilizer (C). The combination of the light stabilizer (C) with a further ultraviolet absorber (F) showed a synergistic effect and improves the efficiency of the light absorption significantly and leads to improved results in terms of weatherability. Preferably the ultraviolet light absorber (F) does not comprise a hindered amine moiety. Typically the ultraviolet light absorber (F) is selected from the group consisting of 2-hydroxy-phenylbenzotriazole or its derivatives, hydroxybenzophenone or its derivatives and 2-hydroxyphenyltriazine and its derivatives. An especially preferred ultraviolet light absorber (F) is 2-[2-hydroxy-3,5-di-(1,1-dimethylbenzyl)]-2H-benzotriazole which is commercially available as Tinuvin® 234 from BASF.

Preferably, the weight ratio of the ultraviolet light absorber (F) to the light stabilizer (C) ranges from 1:5 to 5:1, preferably 1:4 to 4:1, especially 1:2 to 2:1.

According to a further preferred aspect of the present invention the composition or the molding composition of the invention may in addition to the light stabilizer (C) further comprise one or more light stabilizer(s) (H) which is/are different from light stabilizer (C). Preference is given to a light stabilizer (H) having a molecular weight higher than 1000 g/mol. More preferably light stabilizer (H) has a molecular weight higher than 1050 g/mol, further preferably a molecular weight ranging from 1100 to 5000 g/mol, especially 1200 to 3000 g/mol or 1250 to 2500 g/mol. Good results in terms of weatherability performance have been found where the additional light stabilizer (H) comprises a hindered amine moiety as defined above in conjunction with light stabilizer (C). Thus, preferably light stabilizer (H) is a light stabilizer of the hindered amine light stabilizer (HALS) type.

According to a preferred aspect of the present invention stabilizer (H) comprises two or more, preferably 3 or more, more preferably 4 or more, especially 5 or more hindered amine moieties as defined in the above-mentioned formula (I).

Especially preferred are the hindered amine moieties according to formula (I) wherein R is methyl.

Preferably, light stabilizer (H) is selected from the group consisting of dimeric, oligomeric and polymeric hindered amine light stabilizer.

Especially preferred is a light stabilizer (H) which is obtainable by the reaction of 1,2,3,4 butanetetracarboxylic acid tetramethyl ester with 1,2,2,6,6-pentamethyl-4-piperidinol and β,β,β',β'-tetramethyl-2,4,8,10-tetraoxaspiro[5,5] undecane-3,9-diethanol which is commercially available as ADK STAB® LA-63P from ADEKA PALMAROLE.

In a further aspect of the present invention the composition or the molding composition of the invention comprises the light stabilizer (H) in an amount ranging from 0.0 to 3 wt.-%, based on the total weight of the composition or molding composition respectively. The weight ratio of light stabilizer (C) to light stabilizer (H) is preferably 100:1 to 1:100, more preferably 80:1 to 1:80 or 60:1 to 1:60, further preferably 50:1 to 1:50 or 40:1 to 1:40, in particular 1:30 to 30:1 or 20:1 to 1:20, for instance 10:1 to 1:10 or 5:1 to 1:5 or 2:1 to 1:2.

A further component of the composition of the present invention which may be present is at least one reinforcing fiber (D).

Reinforcing fibers are advantageously mineral fibers, such as glass fibers, polymer fibers, in particular organic high-modulus fibers, such as aramid fibers, or metal fibers, such as steel fibers, or carbon fibers or natural fibers, fibers from renewable resources.

These fibers may be in modified or unmodified form, e.g. provided with a sizing, or chemically treated, in order to improve adhesion to the plastic. Glass fibers are particularly preferred.

Glass fibers are provided with a sizing to protect the glassfiber, to smooth the fiber but also to improve the adhesion between the fiber and the matrix material. A sizing usually comprises silanes, film forming agents, lubricants, wetting agents, adhesive agents optionally antistatic agents and plasticizers, emulsifiers and optionally further additives.

Specific examples of silanes are aminosilanes, e.g. 3-trimethoxysilylpropylamine, N-(2-aminoethyl)-3-aminopropyltrimethoxy-silane, N-(3-trimethoxysilanylpropyl)ethane-1,2-diamine, 3-(2-aminoethyl-amino)propyltrimethoxysilane, N-[3-(trimethoxysilyl)propyl]-1,2-ethane-diamine.

Film forming agents are for example polyvinylacetates, polyesters and polyurethanes. Sizings based on polyurethanes may be used advantageously.

The reinforcing fibers may be compounded into the polyoxymethylene matrix, for example in an extruder or kneader. However, the reinforcing fibers may also advantageously take the form of continuous-filament fibers sheathed or impregnated with the polyoxymethylene molding composition in a process suitable for this purpose, and then processed or wound up in the form of a continuous strand, or cut to a desired pellet length so that the fiber lengths and pellet lengths are identical. An example of a process particularly suitable for this purpose is the pultrusion process.

According to the invention, the long-fiber-reinforced polyoxymethylene molding composition may be a glass-fiber bundle which has been sheathed with one or more layers of the polyoxymethylene matrix polymer in such a way that the fibers have not been impregnated and mixing of the fibers and the polyacetal matrix polymer does not take place until processing occurs, for example injection molding. However, the fibers have advantageously been impregnated with the polyacetal matrix polymer.

According to a preferred embodiment, the molding composition of the present invention comprises at least one reinforcing fiber which is a mineral fiber, preferably a glass fiber, more preferably a coated or impregnated glass fiber. Glassfibers which are suitable for the molding composition of the present invention are commercially available, e.g. Johns Manville, ThermoFlow® Chopped Strand 753, OCV Chopped Strand 408 A, Nippon Electric Glass Co. (NEG) Chopped Strand T-651.

The reinforcing fibers are preferably present in the composition of the present invention in an amount ranging from 5 to 50 wt.-%, preferably 7 to 45 wt.-% and especially preferably from 10 to 40 wt.-%, wherein the weight is based on the total weight of the composition.

The coupling agent may react with the active end groups of the POM polymer and with the sizing on the glass fiber to chemically bond the POM to the fiber glass. The chemical bond prevents the glass fiber from separating from the POM, as is typical for standard POM, due to the poor adhesion between the standard POM and the glass fiber. The increased bonding between the POM matrix and the long glass fiber improves the mechanical strength of the POM/fiber glass composites significantly.

According to a preferred embodiment of the invention the reinforcing fibers may also advantageously be impregnated or sheathed in the form of continuous-filament fibers with the remaining parts of the composition (polymer matrix) as defined in the present invention, i.e. the at least one polyoxymethylene (A) having terminal OH-groups of more than 15 mmol/kg, the at least one coupling agent (B), the light stabilizer (C) and the other optional components such as the at least one formaldehyde scavenger (E) and/or other additives, in a suitable process and are wound up or processed in the form of a continuous strand, or chopped to a desired pellet length, so that the fiber lengths and pellet lengths are equal. An example of a process particularly suited to this purpose is the pultrusion process.

In one preferred embodiment of the invention, the long-fiber-reinforced molding composition of the invention is prepared by the pultrusion process, where
  i) fiber bundles are conducted through a die charged with a melt made from a polymer matrix comprising at least one polyoxymethylene (A), the at least one coupling agent (B), at least one light stabilizer (C) and other optional components such as the at least one formaldehyde scavenger (E),
  ii) the immersed fiber bundles are preferably conducted through a shaping die,
  iii) the fiber bundles are optionally cooled,
  iv) the fiber bundles are optionally postformed, and
  v) the fiber bundles are cut to the length of the structure preferably substantially perpendicular to their running direction, or are wound up in the form of a continuous structure.

The impregnation of the fiber bundles with the polymer matrix, for example via pultrusion in step i) of the above process, may also take place by other suitable processes. For example, the fibers may be impregnated by a process in which the fiber bundle is saturated by the polymer matrix, wherein the fiber bundle is laid onto carrier equipment, and wherein the carrier equipment, together with the fiber bundle lying thereon, is conducted through impregnating equipment. A process of this type is described in EP-A-756 536.

The fiber may also be impregnated by a process in which a plastifying extruder is used and a fiber strand is conducted by way of guide apertures and preheating equipment and is wetted with a liquid-film of the polymer matrix in an impregnating apparatus and then is introduced into the plastifying extruder in which the individual fibers are chopped and mixed, the mixture being discharged in the form of a fiber-reinforced polymer composition of the invention, which may be capable of further processing, wherein the following steps can be used:
  a) passing by way of coating nozzles into the inlet of the plastifying extruder, and preferably parallel to the extruder axes and approximately tangentially, the fiber strand is wound up onto an extruder screw and around the extruder screws in an advancing direction, and also drawn into holes in the extruder barrel, whose diameter has been enlarged by at least four times the thickness of the fiber strand, where
  b) preferably in the inlet the right-hand coating nozzle directly applies a film of polymer to one side of the fiber strand, while application to the second side takes place indirectly by pressing the fiber strand into the liquid film of polymer matrix previously applied from the left-hand coating nozzle to the screw shaft, whereupon the individual continuous-filament fibers are subjected to impregnating or penetrating action at the extruder screws on both flat sides of the fiber strand in an inlet and impregnating section and these sides are wetted or saturated by the liquid films of thermoplastic polymer,
  c) and preferably then the fiber strand or the individual fibers thoroughly saturated or thoroughly impregnated with polymer matrix are passed out of the inlet and impregnation section by way of a cutting edge into the short discharge and conveying section of a reduced-diameter barrel, and thus chopped into substantially predetermined lengths.

An example of the process of this type is described in DE-A-1 98 36 787.

The environmentally compatible and cost-effective process described preferably gives a small rod-shaped structure of a certain shape. The length of the rod-shaped structure is from 3 to 100 mm, preferably from 4 to 50 mm, and particularly preferably from 5 to 15 mm. The diameter of the rod-shaped structure, also termed a pellet, is generally from 1 to 10 mm, from 2 to 8 mm, and particularly preferably from 3 to 6 mm.

A further embodiment of the present invention is a process for the manufacturing of a long fiber reinforced molding composition comprising
  a) impregnating a continuous fiber filament with a polymer matrix comprising
    i) at least one polyoxymethylene (A) having terminal OH-groups of more than 15 mmol/kg,
    ii) at least one coupling agent (B),
    iii) at least one light stabilizer (C) and
    iv) optionally at least one formaldehyde scavenger (E) and/or other additives; and
  b) optionally cutting the impregnated fiber filament into pellets.

Preferably, the polymer matrix is melt mixed prior to the impregnation of the continuous fiber filament. The continuous fiber filaments have already been described above. Preferably, the continuous fiber filament is part of a roving or yarn. The process of the invention uses preferably a roving or yarn.

The polyoxymethylenes (A) which can be used have already been defined above. According to a preferred embodiment of the process of the invention the polyoxymethylene (A) has a MVR of more than 35 $cm^3/10$ min, preferably ranging from 40 to 100 $cm^3/10$ min, especially ranging from 55 to 90 $cm^3/10$ min, determined according to ISO 1133 at 190° C. and 2.16 kg.

Further preferably, the polyoxymethylene (A) has a content of terminal hydroxyl groups of at least 40 mmol/kg, preferably at least 55 mmol/kg, more preferably ranging from 60 to 95 mmol/kg and most preferably ranging from 70 to 90 mmol/kg, especially ranging from 80 to 85 mmol/kg.

The compositions of the process preferably comprise
  40 to 90 wt.-% of polyoxymethylene (A),
  0.1 to 5.0 wt.-% of coupling agent (B), which is preferably a polyisocyanate;
  a light stabilizer (C); and
  5 to 45 wt.-% of a reinforcing fiber, preferably a glass fiber or the continuous fiber filament, more preferably a glass fiber roving, wherein the wt.-% (percent by weight) is based on the total weight of the composition.

The especially preferred process is a pultrusion process.

According to one embodiment of the present process the polyoxymethylene (A) is melt blended with a coupling agent, such as a diisocyanate, and light stabilizer (C) in an extruder. The long glass fiber (continuous fiber filaments) is pulled through a die head where the fiber is impregnated with the molten resin. The glass concentration in the final product is controlled by adjusting the amount of resin that is left on the glass fiber when it exits the die head. The coupling agent reacts with the active end groups of the POM and the sizing on the glass fiber to chemically bond the POM to the fiber glass.

A further component of the molding composition of the present invention which may optionally be present is a formaldehyde scavenger (E). Formaldehyde scavengers are additives for scavenging formaldehyde. Suitable formaldehyde scavengers are nitrogen-containing stabilizers. Mainly, of these are heterocyclic compounds having at least one nitrogen atom as hetero atom which is either adjacent to an amino-substituted carbon atom or to a carbonyl group, for example pyridine, pyrimidine, pyrazine, pyrrolidone, aminopyridine and compounds derived therefrom. Advantageous compounds of this nature are aminopyridine and compounds derived therefrom. Any of the aminopyridines is in principle suitable, for example 2,6-diaminopyridine, substituted and dimeric aminopyridines, and mixtures prepared from these compounds. Other advantageous materials are polyamides and dicyane diamide, urea and its derivatives and also pyrrolidone and compounds derived therefrom. Examples of suitable pyrrolidones are imidazolidinone and compounds derived therefrom, such as hydantoines, derivatives of which are particularly advantageous, and those particularly advantageous among these compounds are allantoin and its derivatives. Other particularly advantageous compounds are triamino-1,3,5-triazine (melamine) and its derivatives, such as melamine-formaldehyde condensates and methylol melamine. Very particular preference is given to melamine, methylol melamine, melamine-formaldehyde condensates, and allantoin. Oligomeric polyamides are also suitable in principle for use as formaldehyde scavengers. The formaldehyde scavenger may be used individually or in combination.

Further, the aldehyde scavenger (E) can be a guanidine compound which can include an aliphatic guanamine-based compound, an alicyclic guanamine-based compound, an aromatic guanamine-based compound, a hetero atom-containing guanamine-based compound, or the like.

Examples of the aliphatic guanamine-based compounds include monoguanamines such as acetoguanamine, valeroguanamine, caproguanamine, heptanoguanamine, capryloguanamine or stearoguanamine; alkylene bisguanamines such as succinoguanamine, glutaroguanamine, adipoguanamine, pimeloguanamine, suberoguanamine, azeloguanamine or sebacoguanamine.

Examples of the alicyclic guanamine-based compounds include monoguanamines such as cyclohexanecarboguanamine, norbornene carboguanamine, cyclohexenecarboguanamine or norbornane carboguanamine; and derivatives thereof in which the cycloalkane residue is substituted with 1 to 3 functional groups such as alkyl group, hydroxy group, amino group, acetoamino group, nitrile group, carboxy group, alkoxycarbonyl group, carbamoyl group, alkoxy group, phenyl group, cumyl group or hydroxyphenyl group.

Examples of the aromatic guanamine-based compounds are monoguanamines such as benzoguanamine and derivatives thereof in which the phenyl residue is substituted with 1 to 5 functional groups such as alkyl group, hydroxy group, amino group, acetoamino group, nitrile group, carboxy group, alkoxy carbonyl group, carbamoyl group, alkoxy group, phenyl group, cumyl group or hydroxyphenyl group, (for example, toluguanamine, xyloguanamine, phenylbenzoguanamine, hydroxybenzoguanamine, 4-(4'-hydroxyphenyl)benzoguanamine, nitrilebenzoguanamine, 3,5-dimethyl-4-hydroxybenzoguanamine, 3,5-di-t-butyl-4-hydroxybenzoguanamine, and the like), naphthoguanamine and derivatives thereof in which the naphthyl residue is substituted with the above functional group; polyguanamines such as phthaloguanamine, isophthaloguanamine, terephthaloguanamine, naphthalene diguanamine or biphenylene diguanamine; aralkyl- or aralkylene-guanamines such as phenylacetoguanamine, [beta]-phenylpropioguanamine or xylylene bisguanamine.

Examples of the heteroatom-containing guanamine-based compound include acetal group-containing guanamines such as 2,4-diamino-6-(3,3-dimethoxypropyl-s-triazine; dioxane ring-containing guanamines such as [2-(4',6'-diamino-s-triazin-2'-yl)ethyl]-1,3-dioxane or [2-(4',6'-diamino-s-triazin-2'-ypethyl]-4-ethyl-4-hydroxymethyl-1,3-dioxane; tetraoxospiro ring-containing guanamines such as CTU-guanamine or CMTU-guanamine; isocyanuric ring-containing guanamines such as 1,3,5-tris(2-(4',6'-diamino-s-triazin-2'-yl)ethyl)isocyanurate or 1,3,5-tris[3-(4',6'-diamino-s-triazin-2'-yl)propyl]-isocyanurate); imidazoyl ring-containing guanamines such as guanamine compounds described in JP-A 6-179671 and JP-A 7-10871; imidazole ring-containing guanamines such as guanamine compounds described in JP-A 47-41120, JP-A 3-284675 and JP-A 7-33766; and guanamine compounds described in JP-A 2000-154181, and the like.

Furthermore, the guanamine-based compound includes a compound in which the hydrogen atom of the amino group of the aforementioned guanamine-based compound is substituted with an alkoxymethyl group such as mono- to tetra-methoxymethylbenzoguanamine, mono- to octa-methoxymethyl-CTU-guanamine, or the like.

Among these guanamine-based compounds, particularly preferable are guanamine, acetoguanamine, benzoguanamine, and CTU-guanamine.

Further formaldehyde scavengers (D) which are linked to oligomers or polymers are also suitable. Examples of these groups of formaldehyde scavengers are shown in formula I.

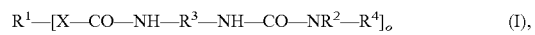

$$R^1-[X-CO-NH-R^3-NH-CO-NR^2-R^4]_o \quad (I),$$

wherein $R^1$ is a moiety comprising 2 to 20 carbon atoms, preferably an aliphatic or aromatic rest, more preferably the aliphatic or aromatic rest of a polyhydroxy or a polyamino compound having at least 2, preferably 2 to 6 hydroxy and/or amino groups, X is —O— or —NR²—

$R^2$ is H, alkyl, cycloalkyl, aryl or aralkyl, $R^3$ is alkylene, cycloalkylene, arylene or aralkylene, $R^4$ is a moiety selected from the formula II, III, IV, V, VI and VII

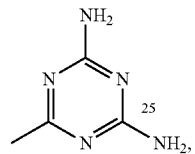

(II)

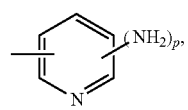

(III)

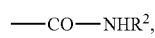

(IV)

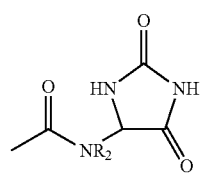

(V)

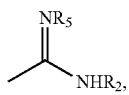 (VI)

 (VII)

wherein $R^5$ is H, —CO—CH$_3$ or —CO—C$_6$H$_5$,
o is an integer ranging from 2 to 6 and
p is 1 or 2.

Additionally, suitable formaldehyde scavengers (D) are imidazolidine-2-one compounds. Preference is given to imidazolidine-2-one compounds of the following formula:

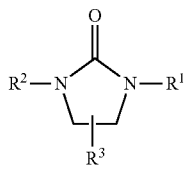

wherein $R^1$ and $R^2$ are independently from each other H, $C_1$-$C_{20}$-alkyl, OR4, —NO$_2$, hydroxyalkyl having 1 to 10 carbon atoms, $R^3$ is H, $C_1$-$C_{20}$ alkyl which is optionally substituted, keto group, aldehyde group, —COOR4, amine or amide group, or an aromatic ring having 5 to 10 carbon atoms, $R^4$ is a $C_1$-$C_4$-alkyl.

Especially preferred imidazolidine-2-one compounds are:

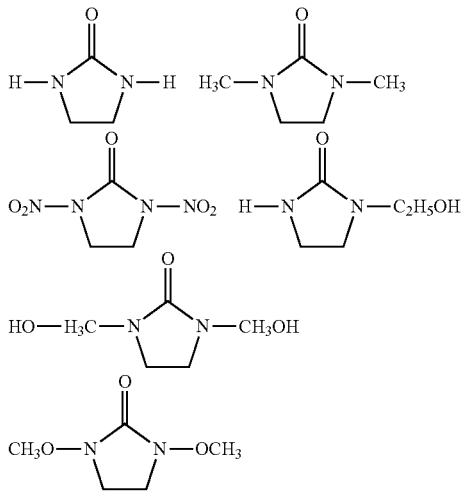

It has been surprisingly found that aromatic formaldehyde scavengers (E) are very suitable for the molding compositions of the present invention.

According to a preferred embodiment of the present invention, the formaldehyde scavenger (E) has a melting point higher than 235° C., preferably higher than 250° C., more preferably higher than 280° C., most preferably higher than 300° C. and especially higher than 320° C. Further, it has been found that the pKa value of the formaldehyde scavenger (E) may influence the formaldehyde emission. According to a preferred embodiment, the formaldehyde scavenger (E) has a pKa value ranging from 4.5 to 10, preferably from 4.5 to 6.5.

Further, preference is given to a formaldehyde scavenger (E) which has at least one triazine moiety. The use of formaldehyde scavengers which comprise at least one triazine moiety does not only have excellent formaldehyde reducing properties but also positively influences the mechanical properties of the molding composition. Preferred formaldehyde scavengers (E) which comprise a triazine moiety are selected from the group consisting of guanamine, melamine, N-butylmelamine, N-phenylmelamine, N,N-diphenylmelamine, N,N-diallylmelamine, N,N',N''-triphenylmelamine, benzoguanamine, acetoguanamine, 2,4-diamino-6-butyl-sym-triazine, ammeline, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine, 1,1-bis(3,5-diamino-2,4,6-triazinyl)methane, 1,2-bis(3,5-diamino-2,4,6-triazinyl) ethyne (other name: succinoguanamine), 1,3-bis(3,5-diamino-2,4,6-triazinyl)propane, 1,4-bis(3,5-diamino-2,4,6-triazinyl)butane, methylated melamine, ethylenedimelamine, triguanamine, melamine cyanurate, ethylene dimelamine cyanurate and riguanamine cyanurate. These triazine derivatives may be used singly or in combinations of two or more compounds. Guanamines and melamine are preferred, and melamine is particularly preferable.

Preferred formaldehyde scavengers (E) are hydrazides, more preferably dihydrazides such as sebacic dihydrazide (SDH).

Examples of the hydrazide compound which can be used in the present invention as formaldehyde scavenger (E) include an aliphatic carboxylic acid hydrazide-based compound, an alicyclic carboxylic acid hydrazide-based compound, an aromatic carboxylic acid hydrazide-based compound, hetero atom-containing carboxylic acid hydrazide-based compound, a polymer-type carboxylic acid hydrazide-based compound, and the like. These carboxylic acid hydrazides can be used alone or in combination of two or more of them.

Examples of the aliphatic carboxylic acid hydrazide-based compound include: monocarboxylic acid hydrazide (lauric acid hydrazide, stearic acid hydrazide, 12-hydroxystearic acid hydrazide 1,2,3,4-butane tetracarboxylic acid hydrazide or the like); polycaboxylatic acid hydrazide such as succinic acid mono- or di-hydrazide, glutaric acid mono- or di-hydrazide, adipic acid mono- or di-hydrazide, pimelic acid mono- or di-hydrazide, suberic acid mono- or di-hydrazide, azelaic acid mono- or di-hydrazide, sebacic acid mono- or di-hydrazide, dodecanedioic acid mono- or di-hydrazide, hexadecane dioic acid mono- or di-hydrazide, eicosandioic acid mono- or di-hydrazide, 7,11-octadecadiene-1,18-dicarbohydrazide, and the like. Examples of the alicyclic carboxylic acid hydrazide-based compound include: monocarboxylic acid hydrazides such as cyclohexane carboxylic acid hydrazide; and polycarboxylic acid hydrazides such as dimer acid mono- or di-hydrazide, trimer acid mono- to tri-hydrazide, 1,2-, 1,3-, or 1,4-cyclohexane dicarboxylic acid mono- or di-hydrazide, cyclohexane tricaboxylic acid mono- to tri-hydrazide, and the like.

Examples of the aromatic carboxylic acid hydrazide include: mono-carboxylic acid hydrazides (benzoic acid hydrazide and functional group substitution products thereof, such as derivatives where functional groups such as alkyl group, hydroxy group, acetoxy group, amino group, acetoamino group, nitrile group, carboxy group, alkoxycarbonyl group, carbamoyl group, alkoxy group, phenyl group, benzyl group, cumyl group, or hydroxyphenyl group are substituted by 1 to 5 phenyl residues of benzoguanamine (for example, o-toluic acid hydrazide, m-toluic acid hydrazide, p-toluic acid hydrazide, 2,4-, 3,4-, 3,5- or 2,5-dimethylbenzoic acid hydrazide, o-, m- or p-hydroxy-benzoic acid hydrazide, o-, m- or p-acetoxy-benzoic acid hydrazide, 4-hydroxy-3-phenyl-benzoic acid hydrazide, 4-actoxy-3-phenyl-benzoic acid hydrazide, 4-phenyl-benzoic acid hydrazide, 4-(4'-phenyl)benzoic acid hydrazide, 4-hydroxy-3,5-dimethyl-benzoic acid hydrazide, 4-hydroxy-3,5-di-t-butyl-benzoic acid hydrazide, 4-hydroxy-3,5-di-t-butylphenyl-benzoic acid hydrazide, and 4-hydroxy-3,5-di-t-butylphenyl-propionic acid hydrazide); [alpha]- or [beta]-naphthoic acid hydrazide and functional substitution products thereof, such as 1-naphthoic acid hydrazide, 2-naphthoic acid hydrazide, 3-hydroxy-2-naphthoic acid hydrazide, or 6-hydroxy-2-naphthoic acid hydrazide; and polycarboxylic acid hydrazides such as isophthalic acid mono- or di-hydrazide, terephthalic acid mono- or di-hydrazide, 1,4- or 2,6-naphthalene dicarboxylic acid mono- or di-hydrazide, 3,3'-, 3,4'- or 4,4'-diphenyldicarboxylic acid mono- or di-hydrazide, diphenylether dicarboxylic acid mono- or di-hydrazide, diphenylmethane dicarboxylic acid mono- or di-hydrazide, diphenylethane dicarboxylic acid mono- or di-hydrazide, diphenoxyethane dicarboxylic acid mono- or di-hydrazide, diphenylsulphone dicarboxylic acid mono- or di-hydrazide, diphenylketone dicarboxylic acid mono- or di-hydrazide, 4,4"-terphenyl dicarboxylic acid mono- or di-hydrazide, 4,4'''-quaterphenyldicarboxylic acid mono- or di-hydrazide, 1,2,4-benzene tricarboxylic acid mono- to tri-hydrazide, pyromellitic acid mono- to tetra-hydrazide, and 1,4,5,8-naphthoic acid mono- to tetra-hydrazide).

Examples of the heteroatom-containing carboxylic acid hydrazide-based compound include: mono- or di-hydrazide of dioxane ring-containing carboxylic acid hydrazides such as 5-methylol-5-ethyl-2-(1,1-dimethyl-2-carboxyethyl)-1,3-dioxane; tetraoxo spiro ring-containing carboxylic acid hydrazides such as mono- or di-hydrazide of 3,9-bis(2-carboxyethyl)-2,4,8,10-tetraoxospiro[5,5]undecane, mono- or di-hydrazide of 3,9-bis(2-methoxycarbonylethyl)-2,4,8,10-tetraoxospiro[5,5]undecane, mono- or di-hydrazide of 3,9-bis(1,1-dimethyl-1-carboxymethyl)-2,4,8,10-tetraoxospiro[5,5]undecane, or mono- or di-hydrazide of 3,9-bis(1,1-dimethyl-1-methoxycarbonylmethyl)-2,4,8,10-tetraoxospiro[5,5]undecane; isocyanuric ring-containing carboxylic acid hydrazides such as mono- to tri-hydrazide of 1,3,5-tris[2-carboxyethyl]isocyanulate, or mono- to tri-hydrazide of 1,3,5-tris(3-caboxypropyl)isocyanurate; and hydantoin ring-containing carboxylic acid hydrazides such as 1,3-bis(2-hydrazinocarbonylethyl)5-isopropyl hydantoin.

The polymer-type carboxylic acid hydrazide-based compounds are exemplified as follows: single polymers or copolymers of poly(meth)acrylic acid hydrazides which may be cross-linked compounds, such as olefin copolymer, vinyl monomer copolymer, styrene copolymer of divinylbenzene crosslinked compound, or bis(meth)acrylic ester crosslinked compound; polymer described in JP-A 55-145529 and JP-A 56-105905; commercially available "amino polyacrylic amide APA" Otsuka Chemical Co., Ltd.; and copolymer described in U.S. Pat. No. 3,574,786.

Further, dicyandiamide (DCD) can be used as component (E).

Further, zeolites can be used as component (E).

According to a preferred embodiment of the present invention, the formaldehyde scavenger (E) has at least one —NH$_2$, preferably at least two —NH$_2$ groups, most preferably at least three —NH$_2$ groups.

It has surprisingly been found that an excellent performance can be achieved with a formaldehyde scavenger (E) which has a melting point which is at least 10° C., preferably at least 20° C., more preferably at least 30° C., even more preferably at least 50° C. higher than the melting point of the polyoxymethylene (A).

Especially preferred as a formaldehyde scavenger (E) is melamine.

The formaldehyde scavenger (E) is preferably present in the composition in an amount of up to 2 weight-%, more preferably in an amount ranging from 0.001 to 1.5 wt.-%, further more preferably ranging from 0.01 to 1.0 wt.-%, most preferably ranging from 0.05 to 0.5 wt.-% and especially ranging from 0.08 to 0.3 weight-%, wherein the weight is based on the total weight of the composition.

The composition or molding composition according to the invention can optionally be stabilized and/or modified by known additives. Such optional additives used as optional component (G) are known to the person skilled in the art. Examples of such additives may be processing auxiliaries.

Component (G) is usually present in an amount up to 10 wt.-%, preferably 0.1 to 5 wt.-%, more preferably 0.5 to 3 wt.-%.

The optional stabilizers are, for example, antioxidants, acid scavengers or heat stabilizers. In addition, the molding material or the molding may optionally contain processing auxiliaries, for example adhesion promoters, lubricants, nucleating agents, demolding agents, fillers, or antistatic agents and additives which impart a desired property to the molding material or to the molding, such as dyes and/or pigments and/or impact modifiers and/or glass beads and/or materials imparting electrical conductivity; and mixtures of these auxiliaries, but without limiting the scope to said examples.

Stabilizer and processing auxiliaries used as optional component (G) are known to the person skilled in the art.

The molding composition of the present invention may optionally further comprise one or more tribological modifier. Various different types of tribological modifiers may be incorporated into the molding composition of the invention. The tribological modifier may comprise, for instance, polytetrafluoroethylene particles, molybdenum sulfide particles, calcium carbonate particles, polymer particles containing a graft copolymer of an olefin grafted to a polyvinyl or a polyether, graft copolymer particles containing an elastomeric core comprising a polydiene and a hard graft comprised of a (meth)acrylate and/or a (meth)acrylonitrile, ultra-high-molecular-weight polyethylene particles, stearyl stearate particles, wax particles comprising an aliphatic ester wax comprised of a fatty acid and a monohydric alcohol, a polyethylene wax, silicon oil, or an amide wax, or mixtures thereof. In general, one or more tribological modifiers may be present in the composition in an amount from about 1% to about 50% by weight, preferably in an amount ranging from about 3 to about 30 wt.-%.

In a specific embodiment of the present invention the tribological modifier comprises or substantially consists of an ultrahigh-molecular weight polyethylene (UHMW-PE). It has been found that specifically good results could be achieved with molding compositions which comprise coupling agents and reinforcing fibers.

Ultrahigh-molecular-weight polyethylene (UHMW-PE) can be employed for example as a powder, in particular as a micro powder. The use of UHMW-PE significantly reduces wear and improves the sliding properties. The UHMW-PE generally has a mean particle diameter $D_{50}$ (volume based and determined by light scattering) in the range of 1 to 5000 µm, preferably from 10 to 500 µm and particularly preferably from 10 to 150 µm such as 30 to 130 µm or 80 to 150 µm or 30 to 90 µm.

The UHMW-PE can have an average molecular weight of higher than $1.0 \cdot 10^6$ g/mol, preferably higher than $2.0 \cdot 10^6$ g/mol, more preferably higher than $4.0 \cdot 10^6$ g/mol, especially having an average molecular weight ranging from $1.0 \cdot 10^6$ g/mol to $15.0 \cdot 10^6$ g/mol, more especially ranging from $3.0 \cdot 10^6$ g/mol to $12.0 \cdot 10^6$ g/mol, determined by viscosimetry.

Preferably, the viscosity number of the UHMW-PE is higher than 1000 ml/g, more preferably higher than 1500 ml/g, especially ranging from 1800 ml/g to 5000 ml/g, such as ranging from 2000 ml/g to 4300 ml/g (determined according to ISO 1628, part 3; concentration in decahydronaphthalin: 0.0002 g/ml).

In a preferred embodiment the tribological modifier is an UHMW-PE.

Suitable UHMW-PE is commercially available from Ticona GmbH, Germany under the tradename GUR®, such as GUR®4120 and GUR®4150.

In a preferred embodiment the ultrahigh molecular weight polyethylene can be present in an amount up to 30 wt.-%, preferably in an amount ranging from 1 to 25 wt.-%, more preferably ranging from 2.5 to 20 wt.-%, especially 4.5 to 15 wt.-%, such as 5.5 to 12 wt.-%, e.g. 6.5 to 9.5 wt.-%, wherein the amount is based on the total weight of the composition.

A specially preferred composition of the invention comprises
a) 40 to 90 wt.-%, preferably 55 to 85 wt.-% of one or more polyoxymethylene(s)(A),
b) 0.2 to 3.0 wt.-%, preferably 0.3 to 1.5 wt.-% of one or more coupling agent(s) (B), preferably an aromatic polyisocyanate,
c) a light stabilizer or mixtures thereof (C),
d) 5 to 45 wt.-%, preferably 10 to 40 wt.-% of one or more reinforcing fiber(s) (D), preferably glassfiber(s) and
e) optionally 0.05 to 0.5 wt.-%, preferably 0.08 to 0.3 wt.-% of one or more formaldehyde scavenger (E), preferably an aromatic formaldehyde scavenger, more preferably a formaldehyde scavenger having a melting point higher than 235° C., most preferably a formaldehyde scavenger having a melting point which is at least 10° C. higher than the melting point of the polyoxymethylene (A), and especially preferable melamine or a melamine derivative; wherein the weight is based on the total weight of the composition.

The reaction of the components of the composition of the invention is typically effected at temperatures of from 100 to 260° C., such as from 150 to 220° C., and the duration of mixing is typically from 0.2 to 60 minutes. Usually the composition of the invention is converted by a melt mixing step into a molding composition (reactive processing). The reactive processing step can be carried out with the mixture of all components of the composition or with a composition which comprises at least the polyoxymethylene (A) and the coupling agent (B). The further components of the composition may be added after the reactive processing step. However, preferably the reaction is carried out in the presence of at least the components (A), (B) and (C).

A further embodiment of the present invention is a method for producing a molding composition comprising melt mixing composition of the present invention. The melt mixing is preferably carried out at a temperature ranging from 120° C. to 260° C., more preferably ranging from 120° C. to 200° C. Typically, the melt mixing step is carried out in an extruder.

In one embodiment, the molding composition of the present disclosure is reacted together and compounded prior to being used in a molding process. For instance, in one embodiment, the different components can be melted and mixed together in a conventional single or twin screw extruder at a temperature described above. Extruded strands may be produced by the extruder which are then pelletized. Prior to compounding, the polymer components may be dried to a moisture content of about 0.05 weight percent or less. If desired, the pelletized compound can be ground to any suitable particle size, such as in the range of from about 100 microns to about 500 microns.

A further embodiment of the present invention is a molded part obtainable by molding a molding composition of the present invention.

Preferred molded parts are parts used in the automotive industry, especially housings, latches, window winding systems, wiper systems, sun roof systems, seat adjustment, levers, gears, claws, pivot housings or wiper arms.

The molded parts can be obtained by the molding techniques known in the art such as extrusion, injection molding thermoforming, blow molding, rotational molding and the like.

The molding composition of the present invention is especially suitable to be used in the manufacturing of molded parts used in the automotive industry. Thus, a further embodiment of the present invention is the use of the composition according to the present invention for the manufacturing of molded parts used in the automotive industry.

A further embodiment of the invention is a molding composition which is obtainable by the method of the invention.

Due to the excellent mechanical properties and the excellent weatherability performance and flow properties the molding composition of the invention can be used for several applications where stiffness, tensile strength and high impact resistance are desired as well as UV resistance and weatherability performance is required.

A further embodiment is the use of the composition or molded parts of the present invention for exterior applications, especially in the automotive industry such as for housings, wiper systems, sun roof systems and wiper arms.

A further embodiment of the present invention is a wiper arm comprising the molding composition of the present invention.

EXAMPLES

The following components were used in the Examples of Table 1:
POM 0: MVR 8 cm³/10 min; Polyoxymethylene with a content of 3.4 wt.-% dioxolane comonomer; portion of terminal OH groups: 20-25 mmol/kg; melting point 165° C.
POM 1: MVR 39 cm³/10 min.; polyoxymethylene with a content of 3.4 wt. % dioxolane comonomer; portion of terminal OH groups: 54-80 mmol/kg; melting point 165° C.
B: Methylenediphenyl-4,4'-diisocyanate (MDI)
C: reinforcing fiber (NEG ECS 03 T-651H); sized glass fiber
D: additives (antioxidants, stabilizers, nucleating agents)
D1: Tinuvin® 144 from BASF (light stabilizer of the hindered amine class), MW 685 g/mol All components beside the glass fiber were mixed together. For the compounding a ZSK 25MC, (Werner&Pfleiderer, Germany) was used (zone temperature 190° C., melt temperature about 210° C.). The glass fiber was added using a downstream feeding unit at a suitable position. The screw configuration with kneading elements was chosen so that effective thorough mixing of the components took place during the reactive extrusion as well as an optimal glass fiber length was obtained.

The testing of the prepared molding compositions was performed according to the following standards:

MVR (190° C.; 5 kg): ISO 1133;

Charpy notched impact strength: determined at 23° C. according to ISO 179-1/1eA(CNI);

Elongation at break, stress at break and tensile modulus have been determined according to ISO 527;

Portion of terminal OH groups in POM has been determined as described in K. Kawaguchi, E. Masuda, Y. Tajima, Journal of Applied Polymer Science, Vol. 107, 667-673 (2008).

Melting point of polyoxymethylene (POM) has been determined with Differential Scanning calorimetry (DSC); heating rate 10 K/min according to ISO 11357-1, -2, -3.

Flow properties were measured using the length of a spiral injection moulded under defined conditions (melt temperature: 205° C., tool temperature: 90° C., coil thickness; 2 mm, injection pressure: 800 bar/1000 bar/1200 bar).

Weatherability Testing:

The test plaques of the resin formulations were exposed to ultraviolet light and heat in a Xenon arc weatherometer, operated to automotive test procedure SAE J 1960. The primary conditions of the test are as follows:

|  | Light Cycle | Dark Cycle |
|---|---|---|
| Irradiance [W/m$^2$] | 0.55 |  |
| Black Panel Temperature [° C.] | 70 | 38 |
| Relative Humidity [%] | 50 | 95 |
| Cycle Time [h] 40 Minutes of Light with no spray; 20 Minutes of Light with front specimen spray; 60 Minutes of Light with no spray; 60 Minutes of Dark with back specimen spray. |  |  |

The Xenon arc weatherometer is of the water-cooled, controlled irradiance type. Amount of exposure is measured in terms of the total irradiation the test plaques receive, expressed in kilojoules per square meter. The degree of color change is determined by instrumentally measuring the color of the exposed specimens versus the unexposed specimens. The degree of color change is quantified as the total color difference (Delta E), calculated for the illuminant, expressed in CIELab units, in accordance with ASTM D-224. Samples are measured at various increments of irradiation accumulated by the test plaques.

TABLE 1

Molding compositions

| Example | Type | A % by weight | B % by weight | C % by weight | D % by weight | D1 % by weight |
|---|---|---|---|---|---|---|
| 1 (inventive) | POM 1 | 73.59 | 0.5 | 25 | 0.81 | 0.1 |
| 2 (comparative) | POM 1 | 74.19 | 0 | 25 | 0.81 | 0 |

TABLE 1-continued

Molding compositions

| Example | Type | A % by weight | B % by weight | C % by weight | D % by weight | D1 % by weight |
|---|---|---|---|---|---|---|
| 3 (comparative) | POM 0 | 73.69 | 0.5 | 25 | 0.81 | 0 |
| 4 (comparative) | POM 0 | 74.19 | 0 | 25 | 0.81 | 0 |

TABLE 2

Mechanical properties of molding compositions

| Example | 1 | 2 | 3 | 4 |
|---|---|---|---|---|
| MVR (190° C./5 kg) | 16.6 | 26.6 | 4.1 | 6.2 |
| Tensile Modulus [MPa] | 9500 | 9300 | 9350 | 9100 |
| Stress at break (5 mm/min.) [MPa] | 158 | 126 | 150 | 130 |
| Elongation at break (5 mm/min.)[%] | 3.0 | 2.1 | 3.3 | 2.5 |
| Notched Charpy Charpy Impact Strength [kJ/m$^2$] | 11.2 | 7.8 | 12.1 | 8 |
| Impact Strength [kJ/m$^2$] | 66 | 39 | 67 | 47 |
| Flow path length [mm] 800 bar/1000 bar/1200 bar | 420/ 490/490 | 480/ 560/630 | 240/ 280/330 | 270/ 310/360 |

TABLE 3

Molding compositions

| Examples | A % by weight | B % by weight | C % by weight | D type | D % by weight | E % by weight |
|---|---|---|---|---|---|---|
| 5 (comparative) | 90.24 | 0 | 9.76 | — | 0 | — |
| 6 | 89.41 | 0.4 | 9.76 | D1 | 0.4 | 0.03 |
| 7 (comparative) | 89.41 | 0.4 | 9.76 | D2 | 0.4 | 0.03 |
| 8 (comparative) | 89.41 | 0.4 | 9.76 | D3 | 0.4 | 0.03 |

The following components are used in Table 3:

A: Molding composition from Example 3

B: Tinuvin® 234 from BASF (ultraviolet light absorber)

C: Color concentrate based on POM, containing 20, 8% Elftex® TP, 1,13% additives (E)

D1: Tinuvin® 144 from BASF (light stabilizer of the hindered amine class), MW 685 g/mol D2: Tinuvin® 770 from BASF (light stabilizer of the hindered amine class), MW 481 g/mol D3: Hostavin® N30 (light stabilizer of the hindered amine class), MW>1500 g/mol E: additives (antioxidants, nucleating agents)

TABLE 4

UV performance of molding composition after weatherability testing according to SAE J 1960, 2500 kJ/m$^2$, washed

| | Examples | | | |
|---|---|---|---|---|
| | 5 (comparative) | 6 (inventive) | 7 (comparative) | 8 (comparative) |
| DL* | 1.37 | 1.04 | 1.07 | 1.45 |
| Da* | 0.08 | −0.06 | −0.12 | −0.06 |
| Db* | 0.13 | −0.48 | −0.72 | −0.35 |
| DE* | 1.38 | 1.15 | 1.29 | 1.50 |

TABLE 5

| | Molding compositions | | | | | | |
|---|---|---|---|---|---|---|---|
| | A | B | C | D | E | F | G |
| Examples | % by weight | % by weight | % by weight | % by weight | type | % by weight | % by weight | % by weight |
| 9 | 72.0 | 24.7 | 0.48 | 1.73 | E1 | 0.39 | 0.3 | 0.4 |
| 10 | 72.19 | 24.7 | 0.48 | 1.73 | E1 | 0.2 | 0.3 | 0.4 |
| 11 | 72.79 | 24.7 | 0.48 | 1.73 | — | — | 0.3 | — |
| 12 | 72.39 | 24.7 | 0.48 | 1.73 | — | — | 0.3 | 0.4 |

The following components are used in Table 5:
A: POM 0, MVR 8 cm³/10 min; Polyoxymethylene with a content of 3.4 wt.-% dioxolane comonomer; portion of terminal OH groups: 20-25 mmol/kg; melting point: 165° C.
B: reinforcing fiber (NEG ECS 03 T-651H); sized glass fiber
C: Methylenediphenyl-4,4'-diisocynate (MDI)
D: Elftex® TP, ex Cabot Corporation
E1: Tinuvin® 144 (light stabilizer of the hindered amine class), MW 685 g/mol
F: additives (antioxidants, nucleating agents)
G: Tinuvin® 234 ex BASF (2-[2-hydroxy-3,5-di-(1,1-dimethylbenzyl)]-2H-benzotriazole)

TABLE 6

| Mechanical properties of molding compositions: | | | | |
|---|---|---|---|---|
| Example | 9 | 10 | 11 | 12 |
| MVR (190° C./5 kg) | 5.1 | 5.1 | 4.8 | 5.2 |
| Tensile Modulus [MPa] | 9250 | 9170 | 9310 | 9250 |
| Stress at break (5 mm/min.) [MPa] | 138 | 138 | 137 | 138 |
| Elongation at break (5 mm/min.)[%] | 2.8 | 2.9 | 2.9 | 3.0 |
| Notched Charpy Charpy Impact Strength [kJ/m²] | 10.4 | 9.8 | 10.1 | 10.1 |
| Impact Strength [kJ/m²] | 56.7 | 55.5 | 55.7 | 55.7 |

The invention claimed is:

1. A composition comprising
   a) at least one polyoxymethylene (A) having terminal OH-groups of more than 20 mmol/kg, the at least one polyoxymethylene being present in the composition in an amount ranging from 55 wt. % up to 95 wt. %,
   b) at least one coupling agent (B) comprising a polyisocyanate,
   c) one or more hindered amine light stabilizer(s) (C) having a molecular weight ranging from 500 to 1000 g/mol, and
   d) optionally at least one reinforcing fiber (D).

2. A composition according to claim 1, wherein at least 50%, of the terminal groups of the at least one polyoxymethylene (A) are hydroxyl groups.

3. A composition according to claim 1, wherein the at least one coupling agent (B) is an organic diisocyanate.

4. A molding composition according to claim 1, wherein the at least one polyoxymethylene (A) has a MVR ranging from 20 to 100 cm³/10 min determined according to ISO 1133 at 190° C. and 2.16 kg.

5. A composition according to claim 1, wherein the at least one polyoxymethylene (A) has a content of terminal hydroxyl groups of at least 40 mmol/kg.

6. A composition according to claim 1, wherein the one or more hindered amine light stabilizers (C) has an antioxidant moiety.

7. A composition according to claim 1, wherein the one or more hindered amine light stabilizers (C) has two or more sterically hindered amine groups.

8. A composition according to claim 1, wherein the one or more hindered amine light stabilizers (C) comprises at least one tertiary amine moiety.

9. A composition according to claim 1, wherein the one or more hindered amine light stabilizers (C) has a melting point ranging from 110 to 200° C.

10. A composition according to claim 1, wherein the one or more hindered amine light stabilizers (C) comprises a di-tert-butyl phenol moiety.

11. A composition according to claim 1, wherein the one or more hindered amine light stabilizers (C) is Bis(1,2,2,6,6-penta methyl-4-piperidinyl)[[3,5-bis(1,1-dimethylethyl)-4-hydroxyphenyl]methyl]butylmalonate.

12. Method for producing a molding composition comprising melt mixing the composition as defined in claim 1.

13. Molded article obtained by molding a composition according to claim 1.

14. A composition according to claim 1, wherein the composition contains the at least one reinforcing fiber.

15. A composition according to claim 14, wherein the at least one reinforcing fiber comprises glass fibers, the glass fibers provided with a sizing, the sizing comprising a silane, the at least one reinforcing fiber being present in the composition in an amount from about 7% by weight to about 45% by weight.

16. A composition comprising
   a) a polyoxymethylene polymer having terminal OH-groups of more than 15 mmol/kg, the polyoxymethylene polymer being present in the composition in an amount from about 55 wt % to about 95 wt %;
   b) a coupling agent comprising a polyisocyanate;
   c) a hindered amine light stabilizer having a molecular weight ranging from 500 to 1,000 g/mol, the hinder amine light stabilizer comprising Bis(1,2,2,6,6-pentamethyl-4-piperidinyl)[[3,5-bis(1,1-dimethylethyl)-4-hydroxyphenyl]methyl]butylmalonate; and
   d) glass fibers being present in the composition in an amount from about 5% by weight to about 50% by weight, the glass fibers including a sizing, the sizing comprising a silane.

* * * * *

UNITED STATES PATENT AND TRADEMARK OFFICE
CERTIFICATE OF CORRECTION

PATENT NO. : 9,540,553 B2  
APPLICATION NO. : 14/372498  
DATED : January 10, 2017  
INVENTOR(S) : Kirsten Markgraf et al.

Page 1 of 1

It is certified that error appears in the above-identified patent and that said Letters Patent is hereby corrected as shown below:

On the Title Page

Item (73) should read: Celanese Sales Germany GmbH

Signed and Sealed this  
Tenth Day of April, 2018

Andrei Iancu  
*Director of the United States Patent and Trademark Office*